United States Patent
Uruma (10) Patent No.: US 10,608,812 B2
(45) Date of Patent: Mar. 31, 2020

(54) IMAGE FORMING APPARATUS CAPABLE OF EXECUTING ENCRYPTION PROCESSING, METHOD OF CONTROLLING THE SAME, AND STORAGE MEDIUM

(71) Applicant: CANON KABUSHIKI KAISHA, Tokyo (JP)

(72) Inventor: Shuichi Uruma, Kawaguchi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 285 days.

(21) Appl. No.: 15/642,395

(22) Filed: Jul. 6, 2017

(65) Prior Publication Data

US 2018/0034627 A1 Feb. 1, 2018

(30) Foreign Application Priority Data

Aug. 1, 2016 (JP) ................. 2016-151190

(51) Int. Cl.
| | | |
|---|---|---|
| *H04L 9/12* | (2006.01) | |
| *H04L 9/06* | (2006.01) | |
| *H04L 9/14* | (2006.01) | |
| *H04N 1/00* | (2006.01) | |
| *G06F 12/14* | (2006.01) | |

(Continued)

(52) U.S. Cl.
CPC ............ *H04L 9/06* (2013.01); *G06F 12/1408* (2013.01); *G06F 21/53* (2013.01); *G06F 21/608* (2013.01); *H04L 9/12* (2013.01); *H04L 9/14* (2013.01); *H04N 1/00* (2013.01); *G06F 2212/1052* (2013.01); *G06F 2221/2149* (2013.01)

(58) Field of Classification Search
CPC combination set(s) only.
See application file for complete search history.

(56) References Cited

U.S. PATENT DOCUMENTS

| | | | | |
|---|---|---|---|---|
| 2003/0021440 A1* | 1/2003 | Rhoads | ............... | G06F 12/1408 382/100 |
| 2005/0050344 A1* | 3/2005 | Hull | ...................... | G06F 21/602 713/193 |
| 2007/0171921 A1* | 7/2007 | Wookey | ............... | G06F 3/1415 370/401 |

FOREIGN PATENT DOCUMENTS

JP 2011000768 A 1/2011

* cited by examiner

*Primary Examiner* — Khoi V Le
(74) *Attorney, Agent, or Firm* — Rossi, Kimms & McDowell LLP (57) ABSTRACT

An image forming apparatus capable of suppressing occurrence of a problem in encryption processing. The image forming apparatus includes a plurality of encryption modules for executing encryption processing associated therewith, respectively, including a predetermined encryption module that executes a predetermined encryption processing when mode setting information is set to make the image forming apparatus compliant with a specific standard, for encryption processing. Encryption providers are registered, which are executed in a program environment different from that for the plurality of encryption modules, and are associated with the encryption modules, respectively. Encryption processing is executed via an encryption provider selected from the registered encryption providers by using an encryption module associated with the selected encryption provider. Whether or not to register an encryption provider associated with the predetermined encryption module is determined based on the encryption processing mode-setting information.

8 Claims, 5 Drawing Sheets

(51) Int. Cl.
*G06F 21/53* (2013.01)
*G06F 21/60* (2013.01)

IMAGE FORMING APPARATUS CAPABLE OF EXECUTING ENCRYPTION PROCESSING, METHOD OF CONTROLLING THE SAME, AND STORAGE MEDIUM

BACKGROUND OF THE INVENTION

Field of the Invention

The present invention relates to an image forming apparatus capable of executing encryption processing, a method of controlling the same, and a storage medium.

Description of the Related Art

There has been known an MFP (Multi-Function Peripheral) as an image forming apparatus, including an encryption module that is a software module for performing encryption processing. There are various encryption standards for encryption processing, and to execute encryption processing based on an FIPS140-2 standard (hereinafter referred to as the "FIPS standard") as an example of a specific encryption standard, a dedicated FIPS encryption module is required. For this reason, to support the various types of encryption standards including the FIPS standard, the MFP is provided with at least two types of encryption modules including the FIPS encryption module and an encryption module compliant with another encryption standard. Further, in the MFP, a user can set specific standard necessity information indicating whether or not to make the MFP compliant with the FIPS standard, and one of the FIPS encryption module and encryption modules compliant with other encryption standards is loaded depending on the specific standard necessity information. With this setting, the MFP executes encryption processing desired by the user using one of the FIPS encryption module and the encryption modules compliant with the other encryption standards.

Incidentally, to facilitate functionality extension, the MFP is provided with a plurality of environments for execution of software modules. The MFP has a native environment as an execution environment for software modules that realize standard functions, such as copy, print, scan, and FAX communication functions, and a VM (Virtual Machine) environment as an execution environment for software modules that realizes associated functions each provided as an extension (hereinafter referred to as the "extension function") (see e.g. Japanese Laid-Open Patent Publication (Kokai) No. 2011-768). The MFP has an encryption module in the native environment, and performs encryption processing for a standard function by executing the encryption module. Further, the MFP is provided, in the VM environment, with an FIPS encryption provider and an encryption provider compliant with another encryption standard, which are respective interfaces of the FIPS encryption module and the encryption module compliant with the other encryption standard, and performs encryption processing for each extension function via an associated encryption provider. In short, in recent years, a technique has been under study which performs encryption processing for each extension function by executing an associated encryption module in the native environment via an associated encryption provider in the VM environment.

However, a problem can occur in executing encryption processing via the associated encryption provider in the VM environment. For example, in a case where the specific standard necessity information is set not to make the MFP compliant with the FIPS standard, in the native environment, only the encryption modules compliant with the other encryption standards are loaded, out of the FIPS encryption module and the encryption modules compliant with the other encryption standards. However, the MFP has no mechanism for causing a situation in which the FIPS encryption module in the native environment is unavailable to be reflected only on the FIPS encryption provider in the VM environment. Therefore, there can be a case in which the MFP, which is under a situation in which the FIPS encryption module is not loaded in the native environment, is instructed to execute encryption processing via the FIPS encryption provider in the VM environment. In this case, since the FIPS encryption provider cannot use the FIPS encryption module, there arises a problem of occurrence of an error in the encryption processing performed via the FIPS encryption provider.

SUMMARY OF THE INVENTION

The present invention provides an image forming apparatus that is capable of suppressing occurrence of a problem in encryption processing, a method of controlling the same, and a storage medium.

In a first aspect of the present invention, there is provided an image forming apparatus comprising a memory device that stores a set of instructions, and at least one processor that executes the instructions to provide a plurality of encryption modules, including a predetermined encryption module that executes a predetermined encryption processing in a case where a predetermined encryption processing mode is set, set encryption processing mode-setting information indicating whether or not to cause the image forming apparatus to operate in the predetermined encryption processing mode, register encryption providers that are executed in a program environment different from that for the plurality of encryption modules, and are associated with the encryption modules, respectively, execute encryption processing, via an encryption provider selected from the registered encryption providers, by using an encryption module associated with the selected encryption provider, and determine whether or not to register an encryption provider associated with the predetermined encryption module based on the encryption processing mode-setting information.

In a second aspect of the present invention, there is provided a method of controlling an image forming apparatus provided with a plurality of encryption modules, including a predetermined encryption module that executes a predetermined encryption processing in a case where a predetermined encryption processing mode is set, comprising setting encryption processing mode-setting information indicating whether or not to cause the image forming apparatus to operate in the predetermined encryption processing mode, registering encryption providers that are executed in a program environment different from that for the plurality of encryption modules, and are associated with the encryption modules, respectively, executing encryption processing, via an encryption provider selected from the registered encryption providers, by using an encryption module associated with the selected encryption provider, and determining whether or not to register an encryption provider associated with the predetermined encryption module based on the encryption processing mode-setting information.

In a third aspect of the present invention, there is provided a non-transitory computer-readable storage medium storing a computer-executable program for executing a method of controlling an image forming apparatus provided with a plurality of encryption modules, including a predetermined encryption module that executes a predetermined encryption processing in a case where a predetermined encryption processing mode is set, wherein the method comprises setting encryption processing mode-setting information indicating whether or not to cause the image forming apparatus to operate in the predetermined encryption processing mode, registering encryption providers that are executed in a program environment different from that for the plurality of encryption modules, and are associated with the encryption modules, respectively, executing encryption processing, via an encryption provider selected from the registered encryption providers, by using an encryption module associated with the selected encryption provider, and determining whether or not to register an encryption provider associated with the predetermined encryption module based on the encryption processing mode-setting information.

According to the present invention, it is possible to suppress occurrence of a problem in encryption processing.

Further features of the present invention will become apparent from the following description of exemplary embodiments (with reference to the attached drawings).

DESCRIPTION OF THE EMBODIMENTS

The present invention will now be described in detail below with reference to the accompanying drawings showing embodiments thereof.

In the present embodiment, a description will be given of the configuration for adapting an FIPS standard as an example of a specific standard to a Java (registered trademark) application. The FIPS standard is a standard of encryption, which is used for authenticating that a safe encryption algorithm is properly installed.

Figure 1:
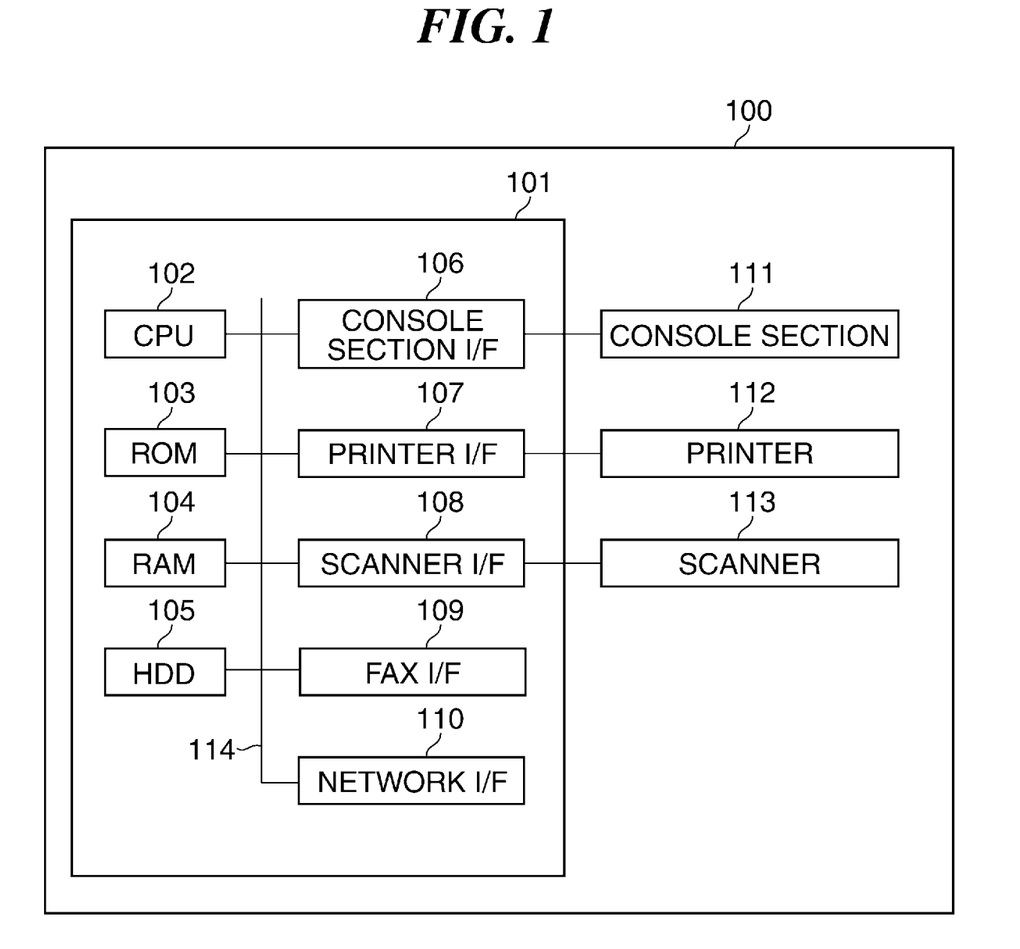
FIG. 1 is a schematic block diagram of an MFP as an image forming apparatus according to an embodiment of the present invention.

FIG. 1 is a schematic block diagram of an MFP 100 as an image forming apparatus according to an embodiment of the present invention.

Referring to FIG. 1, the MFP 100 is comprised of a controller 101, a console section 111, a printer 112, and a scanner 113. The controller 101 is connected to the console section 111, the printer 112, and the scanner 113. Further, the controller 101 includes a CPU 102, a ROM 103, a RAM 104, an HDD 105, a console section interface 106, a printer interface 107, a scanner interface 108, a FAX interface 109, and a network interface 110. The CPU 102, the ROM 103, the RAM 104, the HDD 105, the console section interface 106, the printer interface 107, the scanner interface 108, the FAX interface 109, and the network interface 110 are interconnected via a system bus 114. In place of the MFP 100, there may be used an SFP (Single-Function Peripheral) that is provided with only one of the printer 112 and the scanner 1131

The controller 101 controls the overall operation of the MFP 100. The CPU 102 executes programs stored in the ROM 103 to thereby control processes performed by software modules 200 described hereinafter with reference to FIG. 2. The ROM 103 stores programs executed by the CPU 102 and various data. The RAM 104 is used as a work area for the CPU 102, and is also used as an area for temporarily storing various data. The HDD 105 stores image data and programs. The console section interface 106 performs data communication with the console section 111, the printer interface 107 performs data communication with the printer 112, and the scanner interface 108 performs data communication with the scanner 113. The FAX interface 109 performs FAX communication with an external apparatus via a telephone line, not shown. The network interface 110 performs data communication with an external apparatus via a LAN cable, not shown. For example, the network interface 110 receives print data from an external apparatus. The console section 111 is a user interface of the MFP 100, and receives input information, such as an instruction for executing each processing operation, provided by a user. Further, the console section 111 displays each of setting screens for configuring settings of the MFP 100. The printer 112 performs printing on sheets based on e.g. print data acquired from an external apparatus or image data generated by the scanner 113. The scanner 113 generates image data by reading an original placed on an original platen glass, not shown.

Figure 2:
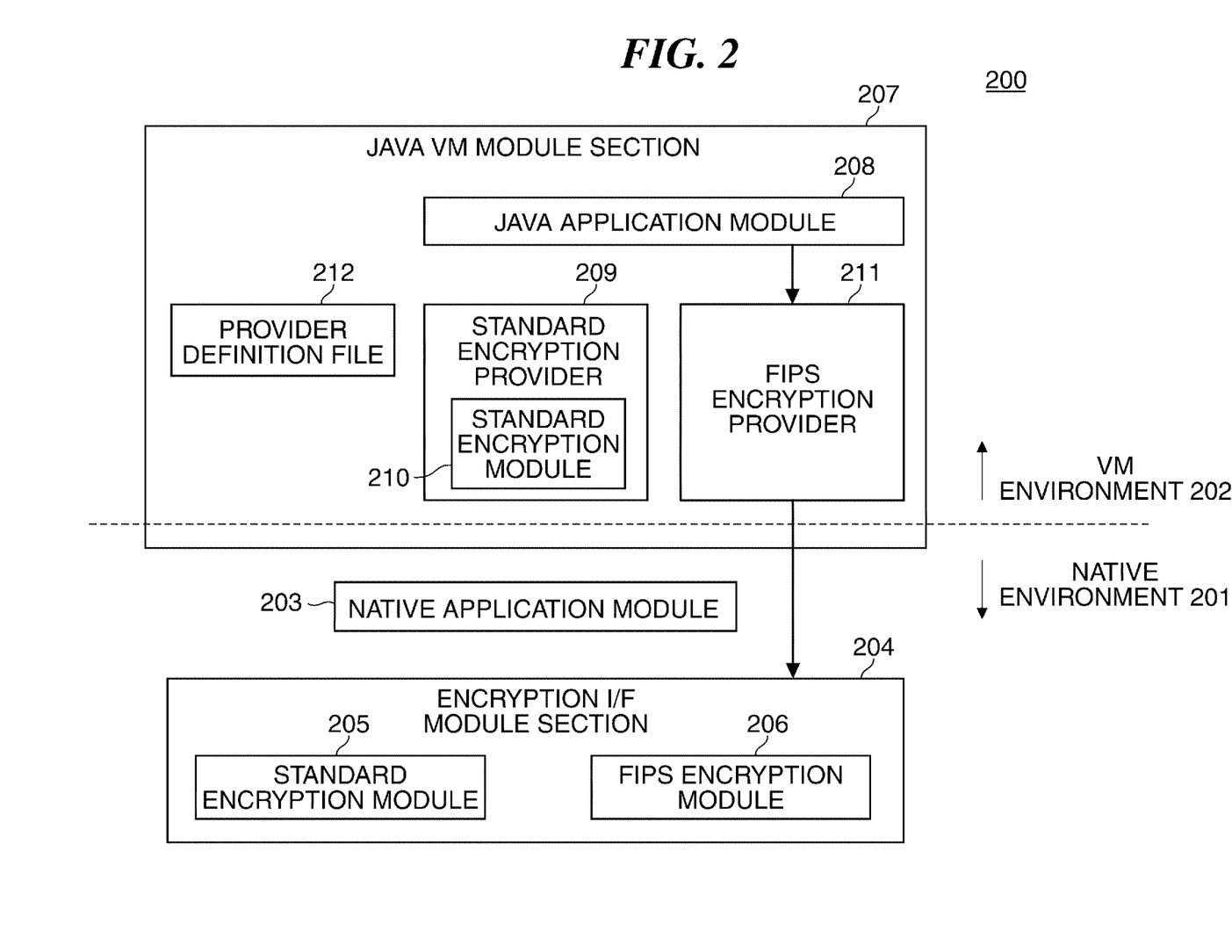
FIG. 2 is a schematic block diagram of software modules of the MFP shown in FIG. 1.

FIG. 2 is a schematic block diagram of the software modules 200 of the MFP 100 shown in FIG. 1. In the present embodiment, each of the software modules 200 shown in FIG. 2 is provided by the CPU 102, as a processor, executing a corresponding program recorded in the HDD 105 or the like. At least part of each module may be realized by hardware.

The MFP 100, as shown in FIG. 2, has a native environment 201 as an execution environment (program environment) for modules that realize standard functions, such as copy, print, scan, and FAX communication functions, and a VM environment 202 as an execution environment for modules that realizes extension functions. This enables the MFP 100 to facilitate functionality extension of functions other than the standard functions. The native environment 201 is provided with a native application module 203 and an encryption interface module section 204, out of the software modules 200. The encryption interface module section 204 includes a standard encryption module 205 and an FIPS encryption module 206 (specific standard encryption module). The VM environment 202 is provided with a Java VM module section 207, out of the software modules 200. The Java VM module section 207 includes a Java application module 208, a standard encryption provider 209, an FIPS encryption provider 211, and a provider definition file 212.

The native application module 203 is formed by a native code obtained by compiling a code described in a C language, and converting the compiled code to a machine language. The native application module 203 realizes the standard functions, such as copy, print, scan, and FAX communication functions, and performs encryption processing for one of the standard functions by loading one of the standard encryption module 205 and the FIPS encryption module 206 of the encryption interface module section 204. The encryption interface module section 204 performs encryption processing for each standard function. The standard encryption module 205 performs encryption processing which is not compliant with the FIPS standard (hereinafter referred to as the "standard encryption processing"). The FIPS encryption module 206 performs encryption processing which is compliant with the FIPS standard (hereinafter referred to as the "FIPS encryption processing"). The FIPS encryption module 206 is a module that has passed an evaluation test for evaluating whether or not requirements defined by the FIPS standard are satisfied. The FIPS encryption module 206 is a module that is inhibited from having the contents thereof changed after the evaluation test, and has a self-testing function for checking whether or not the contents thereof are tampered after the evaluation test. In the present embodiment, the FIPS encryption module 206 is a predetermined encryption module that executes a predetermined encryption processing in a case where a predetermined encryption processing mode has been set. The predetermined encryption processing mode is, for example, a mode for executing, for at least some of processes to be executed by the MFP 100, the predetermined encryption processing using the predetermined encryption module which is compliant with the FIPS standard. Therefore, in the predetermined encryption processing mode, the MFP 100 is in a state in which the function for executing the predetermined encryption processing using the predetermined encryption module has been enabled.

Figure 3:
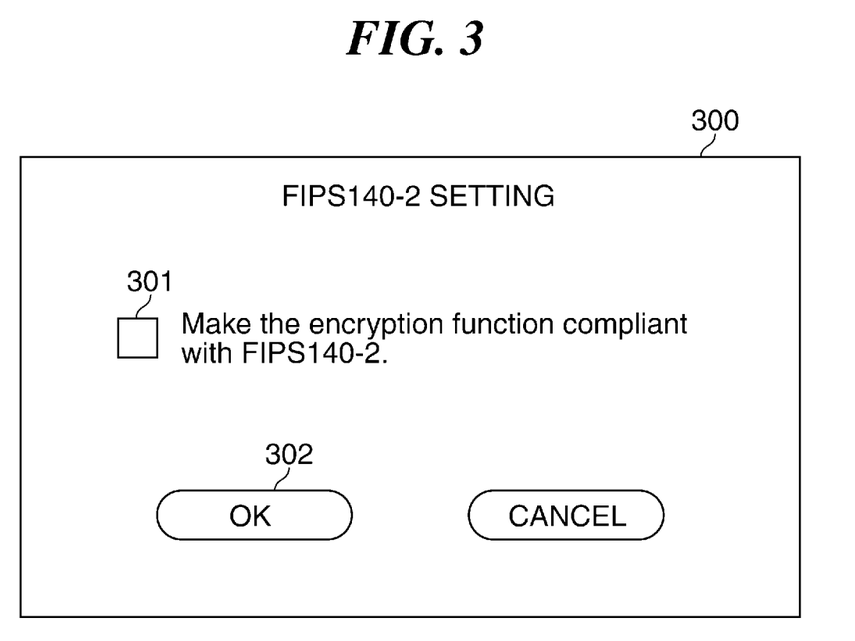
FIG. 3 is a diagram showing an example of a setting screen displayed on a console section appearing in FIG. 1.

Here, for example, in a case where encrypted communication is performed by the FIPS encryption module 206, the communication destination is limited only to an external apparatus compliant with the FIPS standard, which reduces the convenience of a user who desires to execute encrypted communication with an external apparatus which is not compliant with the FIPS standard. Therefore, in the MFP 100, a setting screen 300, shown in FIG. 3, is displayed on the console section 111, for prompting a user to set specific standard necessity information (encryption processing mode-setting information) indicating whether or not to make the MFP 100 compliant with the FIPS standard for encryption processing. The setting screen 300 includes a check box 301 for setting whether or not to make the MFP 100 compliant with the FIPS standard for encryption processing, and an OK button 302. When the check box 301 is checked, and the OK button 302 is selected, the MFP 100 sets the specific standard necessity information to make the MFP 100 compliant with the FIPS standard for encryption processing, and then is restarted. Further, when the OK button 302 is selected without checking the check box 301, the MFP 100 sets the specific standard necessity information not to make the MFP 100 compliant with the FIPS standard for encryption processing, and then is restarted. That is, in the present embodiment, when the specific standard necessity information is set, the MFP 100 is restarted. The specific standard necessity information set on the setting screen 300 is stored and held in the HDD 105 or the like.

The Java application module 208 is formed by a unique byte code formed by compiling and converting a code described in the Java language. The Java application module 208 selects one of the standard encryption provider 209 and the FIPS encryption provider 211 in response to an encryption request from an extension application module, not shown, that realizes an extension function, and executes encryption processing for the extension function via the selected encryption provider.

The standard encryption provider 209 includes a standard encryption module 210 which is not compliant with the FIPS standard, and performs standard encryption processing for an extension function. More specifically, the standard encryption provider 209 causes the standard encryption module 210 to execute encryption processing in response to an encryption request from the Java application module 208. Although in the present embodiment, the description is given of the case where the standard encryption provider 209 includes the standard encryption module 210, the standard encryption provider 209 is not necessarily required to include the standard encryption module 210. For example, the standard encryption provider 209 may cause the standard encryption module 205 in the native environment 201 to execute encryption processing.

Figure 4:
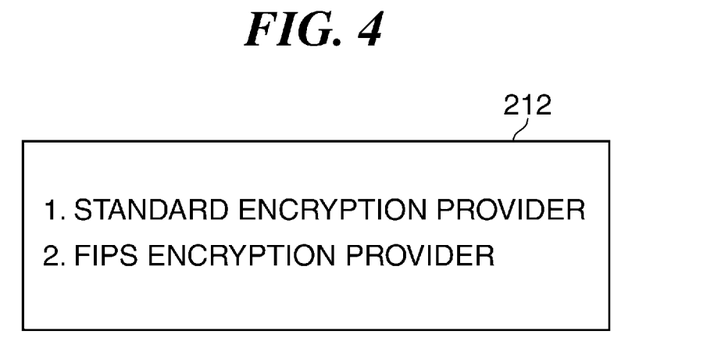
FIG. 4 is a diagram showing an example of a provider definition file appearing in FIG. 2.

The FIPS encryption provider 211 performs FIPS encryption processing for an extension function. More specifically, the FIPS encryption provider 211 causes the FIPS encryption module 206 in the native environment 201 to execute encryption processing in response to an encryption request from the Java application module 208. Note that function call between the native environment 201 and the VM environment 202 uses a JNI (Java Native Interface) function provided in the Java VM module section 207 as a standard function. In the provider definition file 212, names of all encryption providers integrated in the Java VM module section 207 are set in advance, as shown in FIG. 4. The MFP 100 calls the encryption providers set in the provider definition file 212 at the start of the Java VM module section 207, and registers the called encryption providers as available encryption providers. In the present embodiment, the Java application module 208 selects a desired encryption provider from the registered encryption providers, and executes encryption processing for an extension function.

Figure 5:
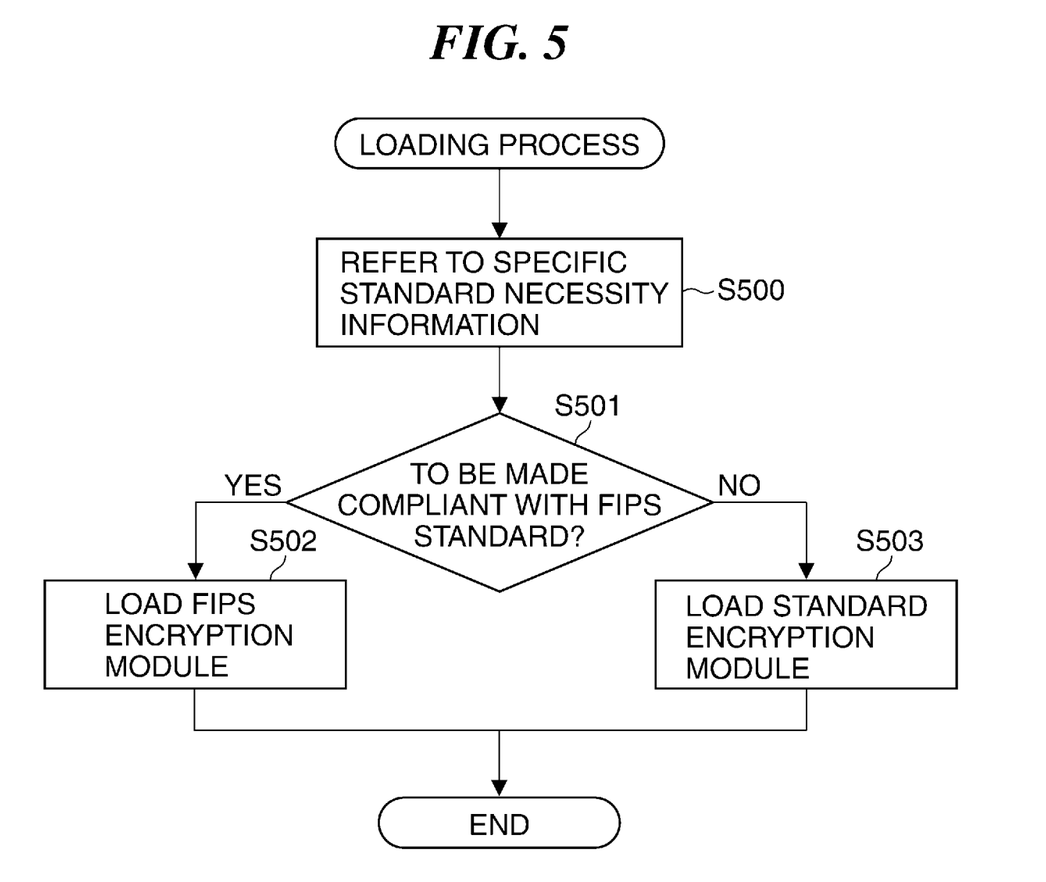
FIG. 5 is a flowchart of a loading process performed by an encryption interface module section appearing in FIG. 2.

FIG. 5 is a flowchart of a loading process performed by the encryption interface module section 204 appearing in FIG. 2.

The loading process in FIG. 5 is performed when the MFP 100 is started.

Referring to FIG. 5, first, the encryption interface module section 204 refers to the specific standard necessity information stored in the HDD 105 (step S500), and determines whether or not the specific standard necessity information has been set so as to make the MFP 100 compliant with the FIPS standard for encryption processing (step S501).

If it is determined in the step S501 that the specific standard necessity information has been set so as to make the MFP 100 compliant with the FIPS standard for encryption processing, the encryption interface module section 204 loads the FIPS encryption module 206 (step S502). This enables the MFP 100 to use the FIPS encryption module 206 in the native environment. After that, the encryption interface module section 204 terminates the present process.

If it is determined in the step S501 that the specific standard necessity information has not been set so as to make the MFP 100 compliant with the FIPS standard for encryption processing, the encryption interface module section 204 loads the standard encryption module 205 (step S503). This enables the MFP 100 to use the standard encryption module 205 in the native environment, and makes the MFP 100 unable to use the FIPS encryption module 206. After that, the encryption interface module section 204 terminates the present process.

Figure 6:
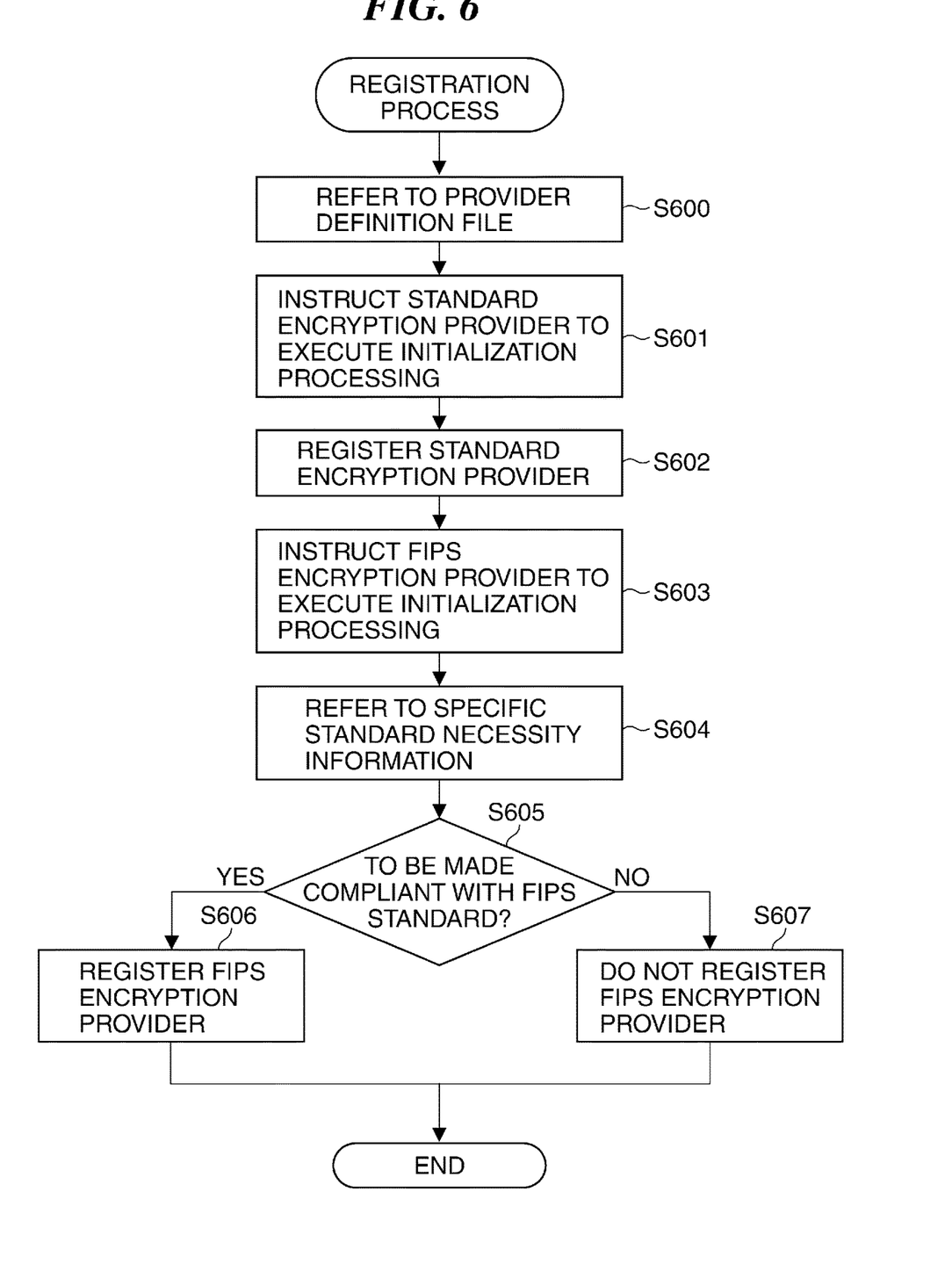
FIG. 6 is a flowchart of a registration process performed by the MFP shown in FIG. 1.

FIG. 6 is a flowchart of a registration process performed by the MFP 100 shown in FIG. 1.

The registration process in FIG. 6 is performed by the CPU 102 that executes a corresponding program stored in the ROM 103.

Here, in the conventional technique, a problem can occur in executing encryption processing via each of associated encryption providers in the VM environment 202. For example, if the specific standard necessity information has not been set so as to make the MFP 100 compliant with the FIPS standard for encryption processing, out of the standard encryption module 205 and the FIPS encryption module 206, only the standard encryption module 205 is loaded in the native environment 201. On the other hand, the MFP 100 has no mechanism for causing a situation in which the FIPS encryption module 206 in the native environment 201 is unavailable to be reflected only on the FIPS encryption provider 211 in the VM environment 202. Therefore, there can be a case in which the MFP 100, which is under a situation in which the FIPS encryption module 206 is not loaded in the native environment 201, is instructed to execute encryption processing via the FIPS encryption provider 211 in the VM environment 202. In this case, since the FIPS encryption provider 211 cannot use the FIPS encryption module 206, there arises a problem of occurrence of an error in the encryption processing performed via the FIPS encryption provider 211.

However, in the present embodiment, encryption processing via an encryption provider selected form the registered encryption providers is executed, and whether or not to register the FIPS encryption provider 211 as an available encryption provider is determined based on the specific standard necessity information.

Referring to FIG. 6, first, the CPU 102 refers to the provider definition file 212 by the Java VM module section 207 (step S600), and calls the standard encryption provider 209. Then, the CPU 102 instructs the standard encryption provider 209 to execute initialization processing (step S601), and registers the standard encryption provider 209 as an available encryption provider (step S602). Then, the CPU 102 calls the FIPS encryption provider 211 based on the provider definition file 212, and instructs the FIPS encryption provider 211 to execute initialization processing (step S603). Then, the CPU 102 refers to the specific standard necessity information stored in the HDD 105 (step S604), and determines whether or not the specific standard necessity information has been set so as to make the MFP 100 compliant with the FIPS standard for encryption processing (step S605).

If it is determined in the step S605 that the specific standard necessity information has been set so as to make the MFP 100 compliant with the FIPS standard for encryption processing, the CPU 102 registers the FIPS encryption provider 211 as an available encryption provider (step S606), followed by terminating the present process. On the other hand, if it is determined in the step S605 that the specific standard necessity information has not been set so as to make the MFP 100 compliant with the FIPS standard for encryption processing, the CPU 102 does not register the FIPS encryption provider 211 as an available encryption provider (step S607). This prevents, when performing encryption processing for the extension function, the FIPS encryption provider 211, which cannot execute FIPS encryption processing because the FIPS encryption module 206 is not loaded in the native environment 201, from being erroneously selected by the Java application module 208. After that, the CPU 102 terminates the present process.

According to the above-described processes in FIGS. 5 and 6, encryption processing via an encryption provider selected from the registered encryption providers is executed, and whether or not to register the FIPS encryption provider 211 as an available encryption provider is determined based on the specific standard necessity information. This makes it possible to eliminate a cause of occurrence of a problem that the FIPS encryption provider 211 is always registered as an available encryption provider when executing encryption processing, and thereby prevent occurrence of the problem in encryption processing.

Further, in the above-described processes in FIGS. 5 and 6, in a case where the specific standard necessity information has not been set so as to make the MFP 101 compliant with the FIPS standard for encryption processing, the FIPS encryption provider 211 is not registered as an available encryption provider. This makes it possible to positively prevent occurrence of a problem, caused by not setting the specific standard necessity information so as to make the MFP 100 compliant with the FIPS standard for encryption processing.

Further, in the above-described processes in FIGS. 5 and 6, the MFP 100 is restarted when the specific standard necessity information is set, and whether or not to register the FIPS encryption provider 211 as an available encryption provider is determined based on the specific standard necessity information when the MFP 100 is started. With this, even when the specific standard necessity information is changed, it is possible to positively cause the changed specific standard necessity information to be reflected on the determination of whether or not to register the FIPS encryption provider 211 as an available encryption provider.

While the present invention has been described with reference to exemplary embodiments, it is to be understood that the invention is not limited to the disclosed exemplary embodiments.

For example, whether or not to register the FIPS encryption provider 211 as an available encryption provider may be determined based on the specific standard necessity information when the Java application module 208 is started, or when communication between the Java application module 208 and the FIPS encryption provider 211 is started. This makes it possible to cause the changed specific standard necessity information to be reflected on the determination of whether or not to register the FIPS encryption provider 211 as an available encryption provider without restarting the MFP 100.

Although in the present embodiment, the description is given of the case where the FIPS standard is used as the specific encryption standard, the specific encryption standard is not limited to the FIPS standard. For example, the specific encryption standard may be another encryption standard which requires a dedicated encryption module and an encryption provider associated with the dedicated encryption module.

Further, although in the present embodiment, the description is given of the case where the FIPS standard is made compatible with the Java application module 208, an application module with which the FIPS standard is compatible is not limited to the Java application module 208. For example, the FIPS standard may be made compatible with an application module created in another language.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-151190 filed Aug. 1, 2016, which is hereby incorporated by reference herein in its entirety.

What is claimed is:

1. An information processing apparatus including a plurality of encryption modules, including a Federal Information Processing Standards (FIPS) encryption module, in a native environment, that executes an encryption processing that is FIPS compliant, the information processing apparatus comprising:
   a memory device that stores a set of instructions; and
   at least one processor that executes the instructions to:
      register a FIPS encryption provider that calls an encryption module that is not FIPS compliant;
      confirm whether or not a setting for making the information processing apparatus execute the encryption processing that is FIPS compliant is set;
      register a FIPS encryption provider that calls an encryption module that is FIPS compliant, in a case where the setting for making the information processing apparatus execute the encryption processing that is FIPS compliant is confirmed to be set;
      load the encryption module that is not FIPS compliant or the encryption module that is FIPS compliant, in accordance with a result of the confirmation;
      execute an encryption processing using one encryption module that is not FIPS compliant, among the plurality of encryption modules, in a case where an encryption request is transmitted from an application that operates in a Virtual Machine (VM) environment and to which the encryption module that is not FIPS compliant is loaded; and
      execute the encryption processing using the encryption module that is FIPS compliant, in a case where the encryption request is transmitted from the application that operates in the VM environment and to which the encryption module that is FIPS compliant is loaded,
      wherein the registered FIPS encryption provider causes the encryption module that is FIPS compliant to execute the encryption processing in accordance with an encryption request from the application.

2. The information processing apparatus according to claim 1, wherein the at least one processor executes the instructions to:
   restart the information processing apparatus in a case where the setting for making whether or not to make the information processing apparatus to execute the encryption processing that is FIPS compliant is set; and
   determine, when the information processing apparatus is restarted, whether or not to register the FIPS encryption provider that calls the encryption module that is FIPS compliant, based on whether or not the setting for making the information processing apparatus execute the encryption processing that is FIPS compliant is set.

3. The information processing apparatus according to claim 1, wherein the at least one processor further executes the instructions to:
   load the plurality of encryption modules, including the encryption module that is FIPS compliant, in a case where the setting for making the information processing apparatus execute the encryption processing that is FIPS compliant is confirmed to be set; and
   register FIPS encryption providers that are respectively executed in a program environment different from a program environment for the plurality of encryption modules, the FIPS encryption providers being associated with the plurality of encryption modules respectively.

4. The information processing apparatus according to claim 1, wherein the at least one processor executes the instructions to provide a setting screen for prompting a user to set whether or not the information processing apparatus executes the encryption processing that is FIPS compliant.

5. The information processing apparatus according to claim 3, wherein the at least one processor executes the instructions to:
   load the encryption module that is FIPS compliant, when the information processing is started, in accordance with FIPS necessity information indicating whether or not to make the information processing apparatus that is FIPS compliant;
   instruct the FIPS encryption provider that calls the encryption module that is FIPS compliant to execute the encryption processing that is FIPS compliant; and
   register the encryption provider associated with the encryption module that is FIPS compliant, in a case where the setting for making the information processing apparatus execute the encryption processing that is FIPS compliant is confirmed to be set in accordance with the FIPS necessity information, when an application module executed in the same program environment, as that for the FIPS encryption provider that calls the encryption module that is FIPS compliant, is started.

6. The information processing apparatus according to claim 1, wherein the at least one processor further executes the instructions to set FIPS necessity information, as information indicating whether or not to make the information processing apparatus execute the encryption processing that is FIPS compliant.

7. A method of controlling an information processing apparatus including a plurality of encryption modules, including a Federal Information Processing Standards (FIPS) encryption module, in a native environment, that executes an encryption processing that is FIPS compliant, the method comprising:
   registering a FIPS encryption provider that calls an encryption module that is not FIPS compliant;

confirming whether or not a setting for making the information processing apparatus execute the encryption processing that is FIPS compliant is set;

registering a FIPS encryption provider that calls an encryption module that is FIPS compliant, in a case where the setting for making the information processing apparatus execute the encryption processing that is FIPS compliant is confirmed to be set;

loading the encryption module that is not FIPS compliant or the encryption module that is FIPS compliant, in accordance with a result of the confirmation;

executing an encryption processing using one encryption module that is not FIPS compliant, among the plurality of encryption modules, in a case where an encryption request is transmitted from an application that operates in a Virtual Machine (VM) environment and to which the encryption module that is not FIPS compliant is loaded; and executing the encryption processing using the encryption module that is FIPS compliant, in a case where the encryption request is transmitted from the application that operates in the VM environment and to which the encryption module that is FIPS compliant is loaded, wherein the registered FIPS encryption provider causes the FIPS encryption module to execute the encryption processing in accordance with an encryption request from the application.

8. A non-transitory computer-readable storage medium storing a computer-executable program for executing a method of controlling an information processing apparatus including a plurality of encryption modules, including a Federal Information Processing Standards (FIPS) encryption module, in a native environment, that executes an encryption processing that is FIPS compliant, the method comprising:

registering a FIPS encryption provider that calls an encryption module that is not FIPS compliant;

confirming whether or not a setting for making the information processing apparatus execute the encryption processing that is FIPS compliant is set;

registering a FIPS encryption provider that calls an encryption module that is FIPS compliant, in a case where the setting for making the information processing apparatus execute the encryption processing that is FIPS compliant is confirmed to be set;

loading the encryption module that is not FIPS compliant or the encryption module that is FIPS compliant, in accordance with a result of the confirmation;

executing an encryption processing using one encryption module that is not FIPS compliant, among the plurality of encryption modules, in a case where an encryption request is transmitted from an application that operates in a Virtual Machine (VM) environment and the setting for making the information processing apparatus execute the encryption processing that is FIPS compliant is confirmed to be not set; and executing an encryption processing using one encryption module that is not FIPS compliant, among the plurality of encryption modules, in a case where an encryption request is transmitted from an application that operates in a Virtual Machine (VM) environment and to which the encryption module that is not FIPS compliant is loaded; and executing the encryption processing using the encryption module that is FIPS compliant, in a case where the encryption request is transmitted from the application that operates in the VM environment and to which the encryption module that is FIPS compliant is loaded, wherein the registered FIPS encryption provider causes the FIPS encryption module to execute the encryption processing in accordance with an encryption request from the application.

* * * * *